No. 779,583. Patented January 10, 1905.

UNITED STATES PATENT OFFICE.

HEZEKIAH KIBBE BROOKS, OF BELLOWS FALLS, VERMONT, ASSIGNOR TO CASEIN COMPANY OF AMERICA, A CORPORATION OF NEW JERSEY.

PROCESS OF PRODUCING ADHESIVES.

SPECIFICATION forming part of Letters Patent No. 779,583, dated January 10, 1905.

Application filed February 24, 1904. Serial No. 195,069.

*To all whom it may concern:*

Be it known that I, HEZEKIAH KIBBE BROOKS, a citizen of the United States, residing at Bellows Falls, in the county of Windham and State of Vermont, have invented or discovered certain new and useful Improvements in Processes of Producing Adhesives, of which the following is a specification.

This invention relates to sizes and adhesives of that class in which starch or other amylaceous material is used. There are several known methods for treating these materials by the use of persulfates and acids in such a way as to render them less hygroscopic, or "modifying" them, as it is sometimes called; but the sizes and adhesives produced from amylaceous substances by the present process are open to the following objections: First, these materials when dissolved do not form amber-colored solutions, which is so characteristic of dissolved animal glue, nor do these solutions possess the "quick tackiness" nor the property of drying out as quickly as glue; second, when these solutions are dried the resulting material has a dull and milky appearance and is of such a nature that it crumbles easily; third, when these materials have been dried and water is again added thereto they do not form solutions like those formed before the drying out in that the tackiness, transparency, and flowing qualities have largely disappeared.

The present invention or discovery obviates the foregoing objections by the use of persulfate and acid and secures amylaceous adhesive products more nearly resembling animal glue than any of the similar products previously made.

The invention or discovery may be carried into effect in the following manner: Mix one hundred pounds of dry fecula with one pound of persulfate (preferably persulfate of ammonia) and fifteen pounds of water. Add two pounds of sulfuric acid, which will usually raise the temperature of the mixture to about 120° Fahrenheit. Should the temperature of the mixture not come up to this point, heat should be applied until the temperature of the mixture has been brought up to about 120° Fahrenheit. The mixture is then preferably agitated at a temperature of at least 100° Fahrenheit, but preferably at a temperature of about 120° Fahrenheit, to modify the fecula. The mixture or modified fecula is then preferably washed or neutralized to eliminate the free acid and the resulting ammonium sulfate. If the product is to be employed as an adhesive to be applied to envelops or labels, a well-washed material free from chemicals which impart a bad taste thereto is better than a neutralized material, although the neutralizing process by the use of any alkali or alkaline salt may be more quickly and easily performed. After being washed or neutralized the modified fecula should be heated to a temperature of about 150° Fahrenheit or above, when it will quickly dissolve and present a very close resemblance in amber-colored appearance and transparency to dissolved animal glue and will be about the same density.

Instead of following the process above described the proportions of persulfate and sulfuric acid may be materially lessened by performing the modifying process at a temperature of about 200° Fahrenheit. Thus one hundred pounds of fecula may be modified, if the modifying process be carried on at a temperature of about 200° Fahrenheit, with about one-half pound of the persulfate and one pound of the acid. In this case the acid should first be added to the fecula and the persulfate dissolved in about an equal amount of water, then be added to the fecula and acid mixture, with a suitable quantity of water.

If the fecula be heated to raise it to the high temperature just referred to in a jacket-kettle, about fifteen pounds of water should be added to one hundred pounds of dry fecula; but if, as is preferable, the fecula be heated by the admission thereto of live steam there will be about fifteen pounds of water present from condensation, and the high temperature to which the mixture is subjected in the agitating modifying process will also dissolve the mixture.

For the purpose of neutralizing the fecula as hereinbefore referred to it is preferable to use with one hundred pounds of the fecula about three pounds of borax, which should be added as the last step in the "modifying" process, so called. If, however, the free acid and ammonium sulfate be removed by washing instead of being neutralized, about one pound of borax should be added to one hundred pounds of the mixture to make the product slightly alkaline, and thus insure a complete solution of the starch cellulose of the fecula.

After being dissolved the material may be removed to any suitable drier and dried out at a temperature not exceeding 250° Fahrenheit. When the product comes from the drier, it will be in its amber-colored appearance and transparency, as also in its sizing and adhesive qualities, very much like animal glue.

The results of modifying fecula by this process depend somewhat upon the temperature at which the modifying process is carried on as well as upon the chemical treatment with acid and persulfate. If for any reason a low temperature be desired, then much larger percentages of the chemicals are required. If, however, a high temperature be not objectionable, then much smaller percentages of the chemicals may be employed. So far as can now be determined a high temperature is not objectionable, excepting that the material when it comes from the modifying-tanks is more gummy and more difficult to dry out.

Having thus described my invention or discovery, I claim and desire to secure by Letters Patent—

1. The herein-described process of producing an amylaceous glue or adhesive, consisting in subjecting a fecula to the simultaneous action of heat, a persulfate and an acid in the presence of water, and then treating it with an alkaline substance.

2. The herein-described process of producing an amylaceous glue or adhesive, consisting in subjecting a fecula to the simultaneous action of heat, persulfate of ammonia, sulfuric acid, and water, during agitation, and then treating it with an alkaline substance.

3. The herein-described process of producing an amylaceous glue or adhesive, consisting in subjecting the fecula to the simultaneous action of heat, a persulfate and an acid and water, and then neutralizing the product or rendering it slightly alkaline by adding borax thereto.

4. The herein-described process of producing an amylaceous glue or adhesive, consisting in subjecting a fecula to the simultaneous action of heat, persulfate of ammonia, sulfuric acid and water, and then adding borax to the product thus formed.

In testimony whereof I affix my signature in presence of two witnesses.

HEZEKIAH KIBBE BROOKS.

Witnesses:
 DANIEL A. LINTON.
 C. H. CAPRON.